United States Patent [19]

Schylander

[11] 4,109,277

[45] Aug. 22, 1978

[54] APPARATUS FOR READING A RECORD CARRIER

[75] Inventor: Eric Christian Schylander, Eindhoven, Netherlands

[73] Assignee: U.S. Philips Corporation, New York, N.Y.

[21] Appl. No.: 759,059

[22] Filed: Jan. 13, 1977

Related U.S. Application Data

[63] Continuation-in-part of Ser. No. 653,082, Jan. 28, 1976, abandoned.

[30] Foreign Application Priority Data

Oct. 17, 1975 [NL] Netherlands .......................... 7512186

[51] Int. Cl.² .............................................. H04N 5/78
[52] U.S. Cl. ...................................................... 358/8
[58] Field of Search .................. 358/4, 8; 360/26, 27, 360/36

[56] References Cited

U.S. PATENT DOCUMENTS 3,921,202  11/1975  Dann et al. ............................... 358/8

FOREIGN PATENT DOCUMENTS 988,391  4/1965  United Kingdom ......................... 358/8

OTHER PUBLICATIONS

I.E.E.E. Transactions on Broadcasting Coleman, vol. BC-17, No. 1, Mar. 1971, pp. 29-36.

*Primary Examiner*—Robert L. Richardson
*Attorney, Agent, or Firm*—Frank R. Trifari; Simon L. Cohen

[57] ABSTRACT

Apparatus for reading a record carrier on which a television signal is recorded. In order to ensure an accurate time error measurement for a time error correction device, use is made of a burst signal which is locked to the horizontal synchronizing pulses. Said burst signal may be constituted by the color burst signal or an additional burst signal which is superimposed on the horizontal synchronization pulse. In order to obtain a pilot signal for the time error measurement a keying signal is generated with the aid of a generator which is controlled by the horizontal synchronizing pulses, the beginning of said keying signal being situated within the time interval of the burst signal. The first zero passage of the burst signal which appears after the beginning of said keying signal is employed as a pilot signal for the time error measurement. In order to increase the reliability of the system an automatic correction system is provided which ensures that the beginning of the keying signal lies halfway between two consecutive zero passages of the burst signal.

10 Claims, 8 Drawing Figures

APPARATUS FOR READING A RECORD CARRIER

This is a continuation-in-part application of Ser. No. 653,082, filed Jan. 28, 1976 and now abandoned.

The invention relates to an apparatus for reading a record carrier on which a television signal is recorded. The signal comprises horizontal synchronizing pulses and burst signals which are coupled to these horizontal synchronizing pulses. The burst signals consist of a number of periods of a carrier wave with a frequency which is an integral multiple of half the line frequency. The read apparatus is provided with a time error correction device for correcting time errors in the read-out television signal and a time error detector for detecting said time errors and for supplying a control signal corresponding to the time error correction device. The time error detector comprises a keying signal generator which is triggered by the horizontal synchronizing pulses. The generator supplies a keying signal which is delayed by a first time interval relative to said horizontal synchronizing pulse. The first time interval is such that the beginning of the keying signal each time lies within the time interval occupied by the burst signal. In addition, a zero passage detector for detecting the first zero passage of the burst signal which appears after the beginning of said keying signal is provided.

In this respect it is to be noted that a record carrier generally contains such a television signal in coded form, i.e. that this television signal is coded in a specific manner before it is recorded. In accordance with a frequently used code the complete television signal, for example a standard PAL or NTSC color television signal, is frequency modulated on a carrier wave. In other coding systems the luminance and chrominance signals are added to separate carrier waves. The coding to which the television signal has been subjected during recording is irrelevant for the present invention, provided that this television signal still exhibits the specified composition with horizontal synchronizing pulses and associated burst signals after the complementary decoding.

Signals which are read from a record carrier generally exhibit time errors. When reading record carriers in the form of a tape, these time errors are inter alia caused by variations in the transport speed and stretch of such record carriers. When reading disc-shaped record carriers these time errors may be caused partly by variations in the transport speed, (in this case the speed of rotation) of the record carrier and partly by eccentricity of the drive point relative to the center of the record carrier.

These time errors are very disturbing when reproducing a television signal which is recorded on a record carrier, in particular, in the case of a color television signal in which two color components are quadrature-modulated on one and the same color carrier wave. In such color television systems said time errors produce very annoying color hue variations, which are not acceptable.

Apparatus for reading such record carriers therefore usually include a time error correction system, with which these time errors can be corrected as far as possible. In such read apparatus both electro-mechanical servo systems and fully electronic systems may be used as time error correction systems. For example in apparatus for reading record carriers in the form of a tape it is common practice to control both the transport speed of the record carrier and the speed with which the read head moves along the record carrier in accordance with the time errors measured. In the case of apparatus for reading a disc-shaped record carrier the same is effected with respect to the speed of rotation of the disc-shaped record carrier. Moreover, such read apparatus generally include an additional correction system in the scanning unit. In the case of a mechanical scanning system this additional correction system for example controls the position of the scanning head in the longitudinal direction of the track on the record carrier. In the case of an optical read system, the information on the record carrier is read with the aid of a beam of radiation and the position of the scanning spot produced on the record carrier by said beam is controlled in the longitudinal direction of the track. Electronic time error correction systems may employ variable delay networks such as bucket brigades, CCD's (charge-coupled devices) and the like.

In all these time error correction devices it is of great importance that the time errors contained in the read-out television signal can be measured with high accuracy. In addition, it is desirable that such a time error correction device has a fairly wide control range, for which purpose the time errors should be measured over a substantially wide range.

In "I.E.E.E. Transactions on Broadcasting", Vol. BC-17, No. 1, March 1971, page 35, a time error detector device for an NTSC color television signal is described which meets these two requirements. In this device use is made of the color burst signal on the back-porch of the horizontal synchronizing pulse in this NTSC color television signal. This color burst signal consists of a number of periods of a carrier wave of a frequency which is an odd integral multiple of half the line frequency, said burst signal having a fixed position relative to the corresponding horizontal synchronizing pulse. A keying signal generator which is triggered by this horizontal synchronizing pulse produces a keying signal, which lies within the time interval occupied by the color burst signal. By detecting the first color burst zero passage appearing after the beginning of this keying signal a pilot signal of line frequency is obtained from which the desired control signal for the time error correction device is derived by comparison with a reference signal of line frequency. As a zero passage of the color burst signal can be detected in a very accurate manner, the time error measurement thus becomes highly accurate. Moreover, since in fact use is made of a pilot tone of line frequency, the time error measuring range, and thus the range of the time error correction, corresponds to one line period of the television signal.

For the time error detection described above it is essential that the beginning of the keying signal within the time interval of the burst signal is well defined, in order that always the same zero passage of said burst signal ultimately functions as the pilot signal. However, the relative positions of the horizontal synchronizing pulse, specifically its leading edge, and said burst signal are not accurately defined. As a result of this, the beginning of the keying signal, which is derived from this horizontal synchronizing pulse, is not accurately defined. This may lead to an erroneous time error measurement in that, owing to the change of the zero passage of the burst signal which acts as a pilot signal, a time error is indicated without the actual occurrence of a time error in the read-out signal.

It is an object of the invention to avoid this problem and the apparatus according to the invention is therefore characterized in that the time error detector comprises a measuring circuit for measuring the time interval between the beginning of this keying signal and the next zero passage of the burst signal which is detected and supplying a corresponding correction signal, and that the keying signal generator is adapted to supply a keying signal which relative to the horizontal synchronizing pulse has a delay equal to a first time interval which is variable depending on the correction signal.

The step in accordance with the invention ensures that the beginning of the keying signal is always situated halfway between two consecutive zero passages of the burst signal regardless of changes in the position of the horizontal synchronizing pulse relative to the burst signal, thus positively ensuring that always the same zero passage of said burst signal functions as pilot signal for the time error detection.

The invention is by no means limited to the use of the color burst signal as stated hereinbefore with respect to the NTSC color television signal. As an alternative an additional burst signal may be added to the television signal to be recorded in an appropriate time interval during each line period. An example of this is the insertion of a burst signal during the time interval of the horizontal synchronizing pulse, resulting in a burst signal which is superimposed on said horizontal synchronizing pulse, which possibility is described in "Consumer Electronics", May 1, 1976, pages 54 and further. The use of such an additional burst signal is of particular importance when utilizing a PAL-standard color television signal, because in this case the color burst signal itself cannot be used for the described time error detection owing to the standard coupling with the line frequency.

Although the invention is by no means limited to such a system, the invention will be described hereinafter on the basis of an optical read system for disc-shaped record carriers. In the drawing:

FIG. 1 shows such an optical read system,

FIG. 2 schematically shows the known time error measuring system, and

Figure 1:
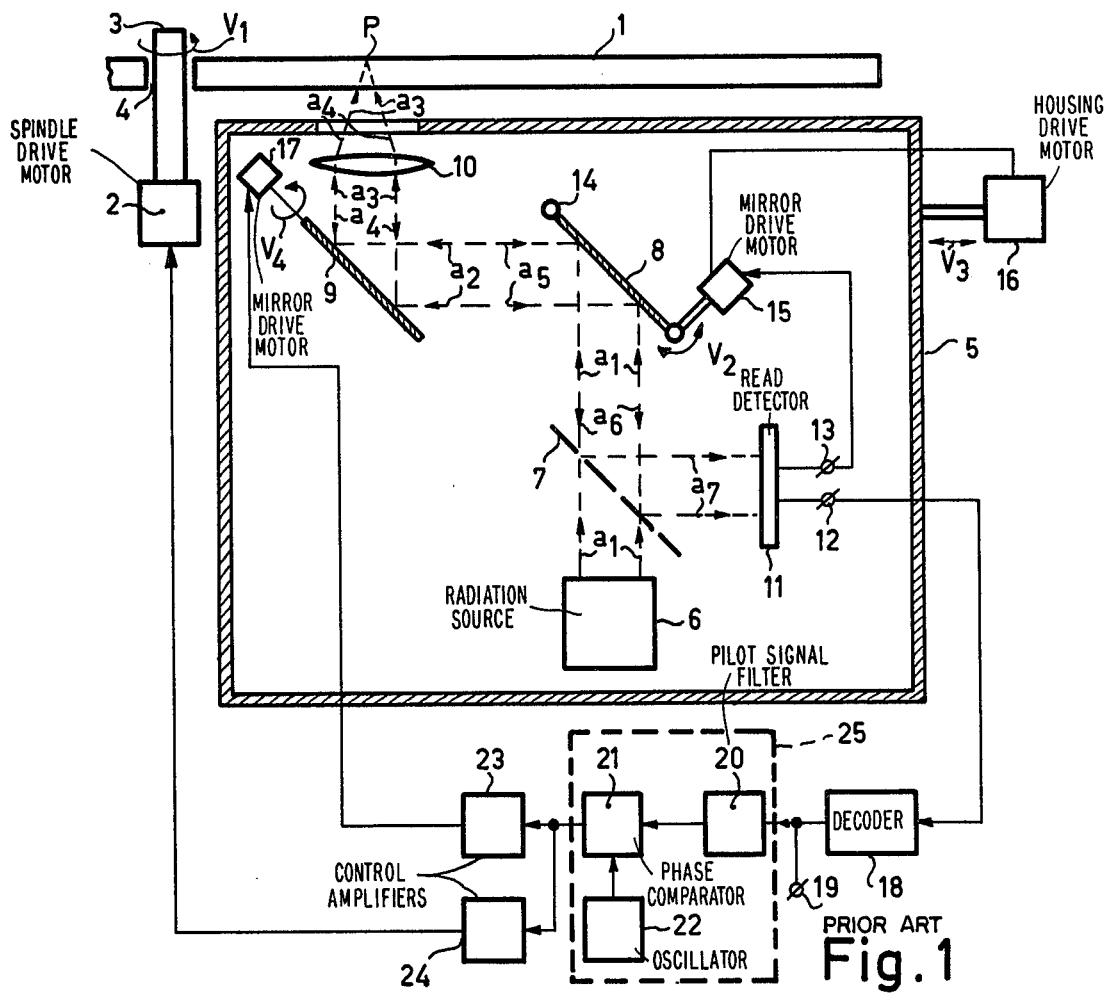

The read apparatus shown in FIG. 1 is suitable for reading a disc-shaped record carrier 1, on whose upper surface tracks are formed (e.g. as turns of a spiral) in which the information is recorded a relief pattern. This track form and method of coding on the record carrier is irrelevant for the principle of the invention. The disc-shaped record carrier 1 is rotated in a direction $V_1$ with the aid of a motor 2 with a disc-supporting spindle 3, which projects through a central opening 4 of the record carrier 1.

The optical system for reading the record carrier 1 is accommodated in a housing 5. This optical system first of all comprises a radiation source 6. This radiation source emits a radiation beam $a_1$ which via a semi-transparent mirror 7 impinges on a mirror 8 and is reflected by this mirror 8 as a radiation beam $a_2$. This radiation beam $a_2$ is reflected as a radiation beam $a_3$ by a mirror 9, which beam is focussed by a lens 10 into the scanning spot P on the upper surface of the record carrier 1. This upper surface of the record carrier 1 is reflecting, so that a radiation beam $a_4$ (which is modulated by the information) is reflected and via the lens 10 impinges on the mirror 9 is reflected as a radiation beam $a_5$ and is then reflected by the mirror 8 as a radiation beam $a_6$. This radiation beam $a_6$ impinges on the semi-transparent mirror 7 so that a part of this radiation beam is reflected as a radiation beam $a_7$ which is incident on a read detector 11. This schematically represented read detector 11 detects the information contained in the radiation beam $a_7$ and supplies a corresponding electrical signal to an output terminal 12.

This signal at the output terminal 12 is applied to a decoding device 18, which converts the applied television signal (which is coded in a specific manner) into a standard television signal which is available at a terminal 19. It is obvious that the design of this decoding device is determined by the coding of the television signal used during recording on the record carrier. If, for example, a composite system is employed, in which the complete standard television signal (i.e. the complete combination of luminance and chrominance signals) is added to a carrier wave as frequency modulation, this decoding device employs a frequency demodulator. The coding method is irrelevant for the principle of the invention.

In order to ensure that the scanning spot P is always incident on the information track on the record carrier, a radial tracking control system is provided with which the radial position of the scanning spot is controlled. This control system first of all comprises a measuring detector for measuring the radial position of the scanning spot P. For the sake of simplicity it is assumed that this measuring detector is included in the read detector 11 and that it supplies a control signal to a terminal 13. Examples of systems with which this radial position of the scanning spot can be measured can be found in the said U.S. Pat. No. 3,381,086, U.S. Pat. No. 3,876,842, and U.S. Pat. No. 3,833,769. This control signal at the terminal 13 is applied to a drive means 15 by which the mirror 8 can be pivoted in the direction $V_2$ about the axis 14. By pivoting this mirror 8 the direction of the beam of radiation $a_1$ is changed and thus the radial position of the scanning spot P. From the average angular position of this mirror 8 a second control signal is derived for a drive means 16 by which the housing 5 can be moved in a radial direction $V_3$.

Owing to the variations in the speed of the drive motor 2 and/or eccentricity of the opening 4 relative to the center of the record carrier 1, the read-out television signal exhibits time errors, which are disturbing, particularly with respect to the color reproduction. In order to correct these time errors a time error correction system is included in the optical read system. This time error correction is achieved with the aid of the mirror 9 which is rotatable by means of a drive element 17 in a direction $V_4$. By pivoting the mirror 9 in this direction the scanning spot P is moved in the longitudinal direction of the information track on the record carrier 1, so that said time error can be corrected.

The control signal required for said drive element 17 is obtained with the aid of a time error detector 25. The decoded television signal is applied to this time error detector. The time error detector 25 first of all comprises a device 20 for extracting a pilot signal suitable for time error measurement from said decoded television signal. The circuit arrangement of this device 20 will be described later. The pilot signal, which has been extracted by the device 20 and whose frequency and phase represent the time errors, is applied to a phase comparator circuit 21, which also receives a reference signal from an oscillator 22. The measured phase difference between the two signals is then a measure of the time errors and is used to obtain the desired control signal for the drive element 17 via a control amplifier 23. The Figure also shows a possibility of deriving the control signal for the drive motor 2 for the record carrier 1 from said time error detector 25 via a control amplifier 24. It is evident that any other pilot signal contained in the television signal may also be used for this purpose, because the two control systems need not comply with the same requirements.

Figure 2:
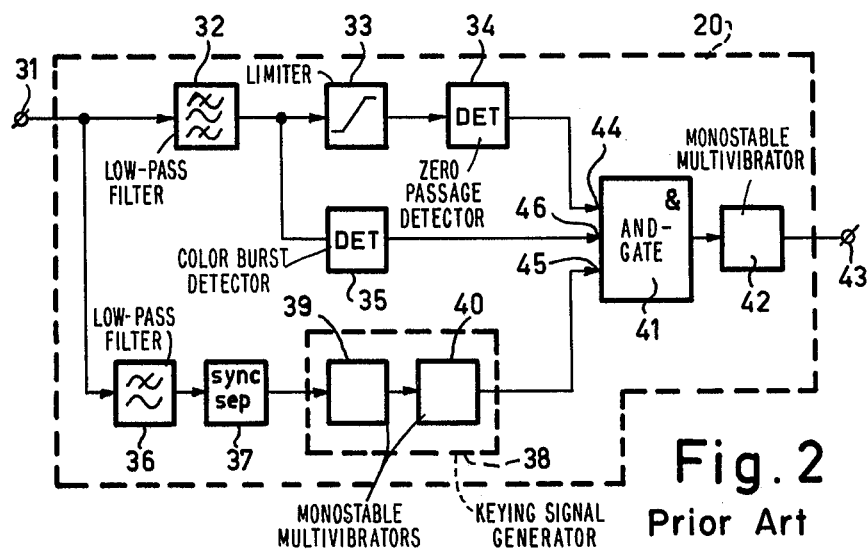
Figure 3:
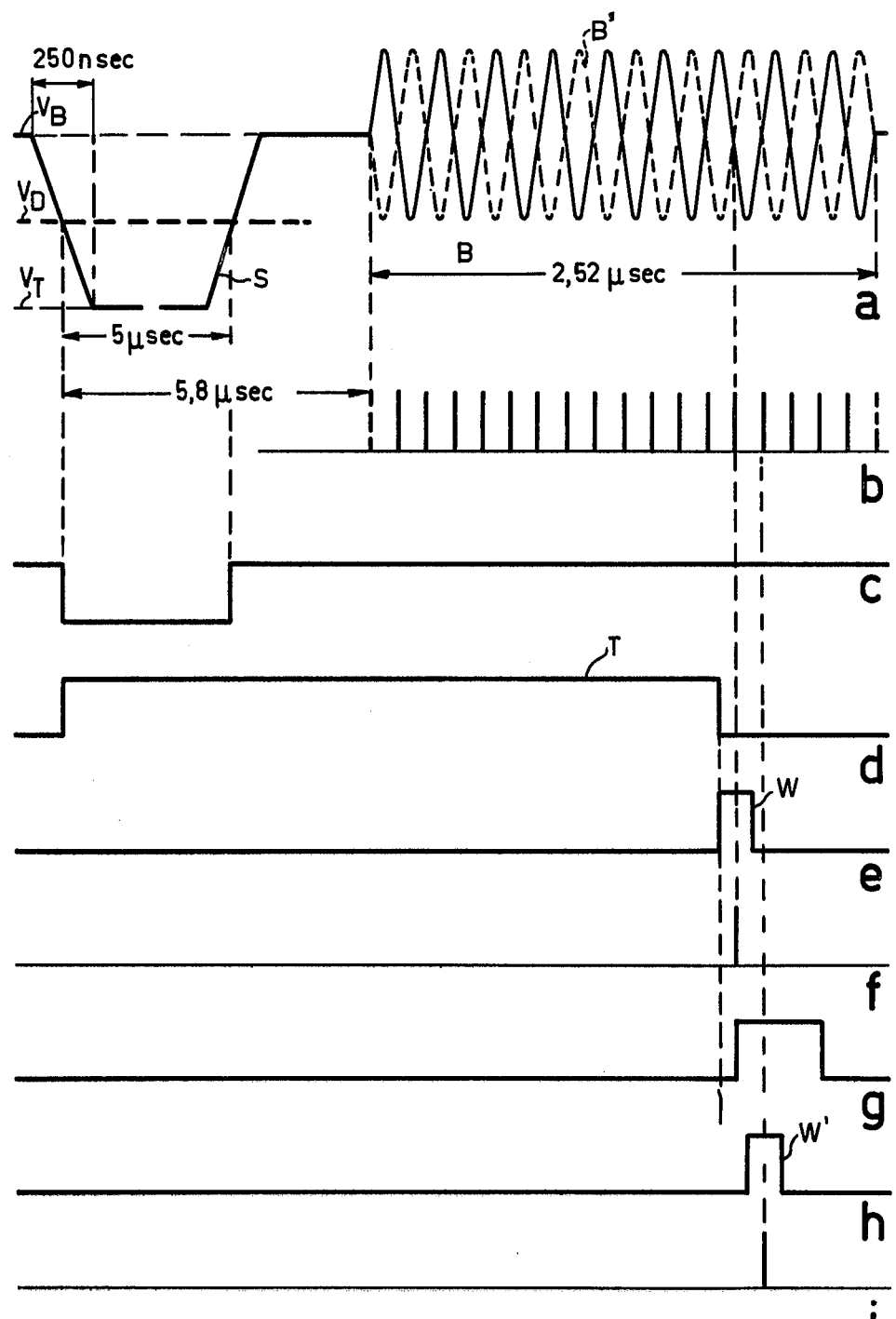
FIG. 3 shows the signals associated with this system.

The previously mentioned known form of the device 20 for extracting a suitable pilot signal is schematically shown in FIG. 2, while FIG. 3 shows the associated signals. In order to clarify the operation of the device of FIG. 2 reference is first of all made to FIG. 3a. FIG. 3a shows a horizontal synchronizing pulse S followed by the color burst signal B in accordance with the NTSC-standard on an enlarged scale. To simplify the drawing the time scale has been interrupted within the horizontal synchronizing pulse. The frequency of the color burst signal B is an odd integral multiple of half the line frequency. This means that exactly one line period after a specific zero passage of this color burst signal another zero passage of the color burst signal corresponding to the next line period appears. This is utilized in the device of FIG. 2.

This device has been adapted to detect always the same zero passage of the color burst signal, so that a line-sequential pilot signal is obtained, which on the one hand results in a wide control range of the time error correction device and on the other hand enables accurate time error measurements to be made. This accuracy results from the fact that the edges of the color burst signal are very steep, thus enabling the relevant zero passage to be detected in an accurate manner, while moreover the disturbing influence of noise which is superimposed on the read-out television signal can substantially be reduced in a simple manner with this zero passage detection by previously passing this burst signal through a narrow-band band-pass filter.

In order to ensure that always the same zero passage of the color burst signal is detected, the device 22 of FIG. 2 comprises a pulse generator 38. This pulse generator 38 is triggered by the horizontal synchronizing pulse, specifically by the leading edge thereof, between the horizontal blanking level $V_B$ and the peak level $V_T$, which synchronizing pulse is extracted from the decoded television signal. For this purpose the device 20 includes a low-pass filter 36, which is connected to the input terminal 31 and to a sync separator 37 which is connected to this low-pass filter 36. This separator in known manner detects the horizontal synchronizing pulses S, for example with a threshold value detector with a threshold value $V_D$, and supplies pulses (see FIG. 3c) which coincide with the synchronizing pulses to the keying signal generator 38. This keying signal generator 38 comprises a first monostable multivibrator 39 which is triggered by these horizontal synchronizing pulses and in response thereto supplies pulses T (see FIG. 3d), the duration of these pulses T being selected so that the trailing edge of these pulses T appears within the time interval occupied by the burst signal. This pulse T is applied to a second monostable multivibrator 40, which is triggered by the trailing edge of this pulse T and in response thereto supplies a pulse W (see FIG. 3e). This pulse W for example has as a pulse width of 140 nanoseconds, i.e. a half period of the color burst signal.

The output of the pulse generator 38, which supplies this pulse W, is connected to a first input 45 of a gate circuit 41. To a second input 44 short pulses (see FIG. 3b) are applied, which represent the zero passages of the burst signal B. For this purpose the device 20 includes a low-pass filter 32 by means of which the frequency band in which the frequency of said burst signal is situated is extracted from the television signal applied to the input terminal 31. The extracted signal is amplified and limited with the aid of a limiter circuit 33 in order to obtain a square wave signal and the zero passages of this square wave signal are detected with the aid of a detector 34. The detector 34 operates in an absolute manner in the case of an NTSC color television signal, i.e. the detector 34 supplies an output pulse upon each zero passage of the burst signal, regardless of the sign of the slope. This is necessary in the case of an NTSC color television signal because the burst signals B and B' in two consecutive line periods are in phase opposition (see FIG. 3a) owing to the fact that the chrominance carrier frequency is locked to half the line frequency.

The gate circuit 41 (performs an AND-function for the signals at its inputs 44 and 45, which means that the output pulse of this gate circuit 41 always (see FIG. 3b) always corrresponds to that pulse from the zero passage detector 34 which appears within the time interval of the pulse W from the pulse generator 38. As a result, a pulse is generated line-sequentially (FIG. 3f) which can be utilized as a pilot signal for time error measurement. If desired, this pulse may also be applied to a monostable multivibrator 42, which derives pulses with a specific pulse width therefrom, which are then available at the output terminal 43 and may be applied to the comparator circuit 21 of FIG. 1 as a pilot signal. If the pulse width selected for the pulses supplied by the monostable multivibrator 42 is greater than the pulse width of the pulses W from the pulse generator, substantially any pulse width may be used for these pulses W, because then only the first pulse from the zero passage detector 34 will result in an output pulse of the multivibrator 42 during a pulse W.

In order to increase the reliability of operation of the device it is useful to include a detector 35 which is connected to the low-pass filter 32 and which detects the presence of a color burst signal. This detector consequently supplies an output pulse as soon as and as long as this color burst signal is present. This output pulse of the color burst detector is also applied to the gate circuit 41 (input 46), so that this gate circuit can only supply an output pulse in the presence of a color burst signal. This additional circuitry caters for the fact that during the vertical flyback period of the television signal a number of picture lines contain no color burst signals. Should the zero passage detector 34 supply a pulse within the pulse W, despite the absence of a color burst signal (for example owing to the occurrence of noise) this does not give rise to an (erroneous) pulse at the output of the gate circuit.

The effect of this additional circuitry becomes more apparent when taking into consideration that in the most frequently used version of the comparator circuit 21 a "hold effect" occurs if no pulses are supplied by the pilot tone separator. This comparator circuit 21 generally operates with a sawtooth-shaped reference signal from the oscillator 22, which signal is then sampled at instants which are defined by the pulses of the pilot tone separator. This sampled value is subsequently retained until the next sampling occurs. As long as the pilot tone separator 20 supplies no pulses, i.e. during a portion of the vertical flyback period, the last sample value is retained as a control signal for the time error correction system.

However, an erroneous pulse from the pilot tone separator during the vertical flyback period would control this time error correction system in a completely incorrect manner. It is true that after the occurrence of some picture lines having color burst signals, this time error correction system will be pulled in again, but as this is obviously involves a delayed response, it could still give rise to disturbances in the displayed picture.

In order to minimize the time during the vertical flyback period that no measuring signal is available it is of course also possible to add additional burst signals to the television signal to be recorded during this vertical flyback period.

A problem associated with the previously described method of generating a suitable pilot signal for time error measurements is caused by the fact that the position of the horizontal synchronizing pulse relative to the burst signal is not accurately defined. This has various causes. First of all, the accuracy with which the horizontal synchronizing pulses are generated prior to recording of the television signal is limited. Furthermore, as previously stated, the accuracy with which these horizontal synchronizing pulses can be detected during reproduction is limited and in this respect the susceptibility to noise plays a part. Furthermore, the phase relation between the horizontal synchronizing pulses and the color burst signal is disturbed, since this burst signal has been passed through a band-pass filter.

As the keying signal W is directly derived from the detected horizontal synchronizing pulse this means that the position of this keying signal within the time interval of the burst signal is inaccurately defined. In the ideal case the instant at which said keying signal W starts, i.e. the position of the leading edge, is situated exactly halfway between two consecutive zero passages of the burst signal. If this keying signal W is now shifted owing to the inaccuracy of the position of the horizontal synchronizing pulse, it may for example happen that the leading edge of this keying signal does not appear until after the desired zero passage of the burst signal, as is shown in FIG. 3h. In that case the next zero passage of the burst signal is then utilized for generating the pilot signal (see FIG. 3i). This change from the one zero passage to the next zero passage for the generation of the pilot signal manifests itself in the time error detection as a time error of 140 nanoseconds, namely the interval between these two zero passages, thus resulting in an incorrect time error measurement and consequently in an incorrect time error correction.

This problem is avoided owing to the step in accordance with the invention. The step in accordance with the invention mainly affects the circuit arrangement of the keying signal generator 38. In order to explain the step in accordance with the invention FIG. 4 schematically shows the circuit arrangement of the pulse generator 38 together with the gate circuit 41, which circuits form part of the device of FIG. 2.

Figure 4:
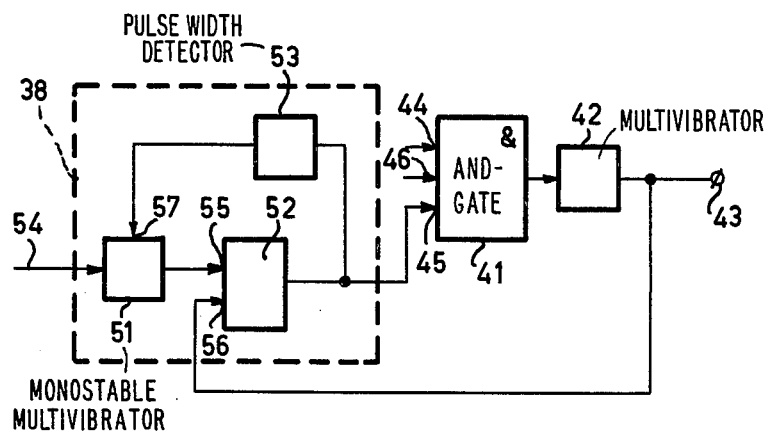
FIG. 4 shows the time error measuring system in accordance with the invention.

The pulse generator 38 shown in FIG. 4 comprises a monostable multivibrator 51 to whose input 54 the extracted horizontal synchronizing pulses supplied by the sync separator 37 are applied (FIG. 2). This monostable mulitivibrator 51 supplies a pulse T which is applied to a set input 55 of a multivibrator 52, whose output is connected to the input 45 of the gate circuit 41. The pulse from the zero passage detector 34 is applied to the input 44 of the gate circuit 41 so as to be keyed out with the aid of said gate circuit, after which it is applied to the reset input 56 of the multivibrator 52, as the case may be after processing by the monostable multivibrator 42. However, the pulse width of the pulse T which is supplied by the monostable multivibrator 51 is not constant but is variable depending on a correction signal which is fed to a control input 57 of this monostable multivibrator 51.

Figure 5:
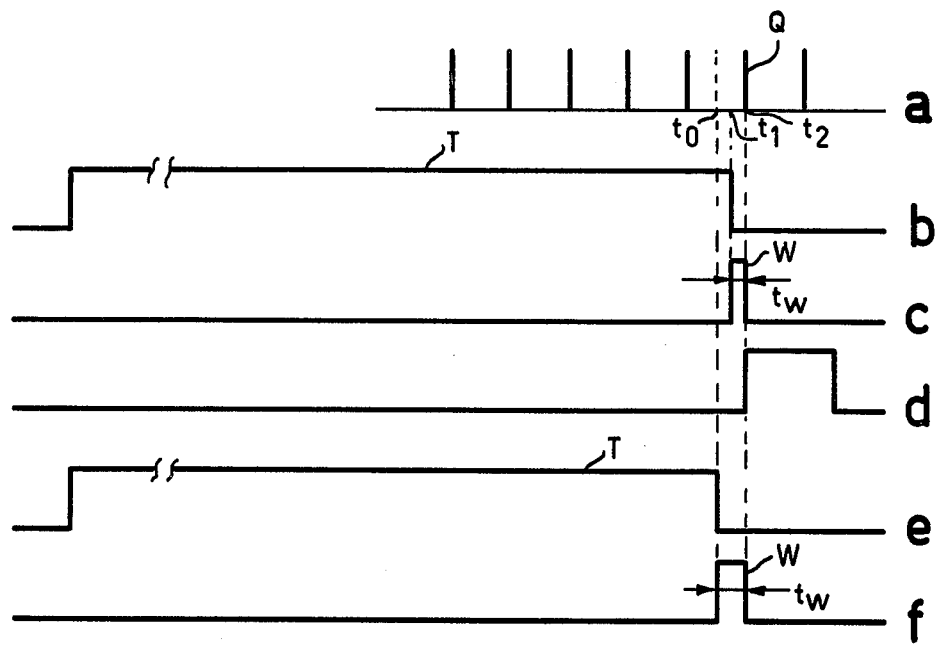
FIG. 5 shows the associated signals.

The operation of the circuit will now be described with reference to FIG. 5. FIG. 5a shows a number of pulses which are supplied by the zero passage detector 34 and which thus represent the zero passages of the burst signal. FIG. 5b shows a pulse T supplied by the monostable multivibrator 51, whose leading edge again coincides with the leading edge of the horizontal synchronizing pulse and whose trailing edge of situated within the time interval occupied by the burst signal. In the ideal situation the trailing edge of this pulse T should occur at an instant $t_0$ exactly halfway between two successive zero passages of the burst signal. However, it is assumed that owing to the inaccuracy of the horizontal synchronizing pulse this trailing edge appears at an instant $t_1$. This trailing edge of the pulse T triggers the multivibrator 52, so that said multivibrator changes over (FIG. 5c). When at the instant $t_2$ a pulse Q from the zero passage detector is applied to the gate circuit 41 a pulse (FIG. 5d) is produced at the output of the monostable multivibrator 42, which pulse is applied to the reset input 56 of the multivibrator 52. This pulse resets the multivibrator 52 to its original state at the instant $t_2$, so that the output signal of this multivibrator is the pulse W shown in FIG. 5c.

From the Figure it is evident that the pulse width $t_w$ of this pulse W corresponds to the time interval $t_2-t_1$, so that it is a measure of the position of the trailing edge of the pulse T between the two consecutive zero passages of the burst signal. This data is utilized by the invention for automatically correcting the position of the trailing edge of the pulse T. The pulse width $t_w$ of the pulse W is measured with the aid of a measuring circuit 53 and converted into a correction signal for the monostable multivibrator 51. In the example of FIG. 5 this correction signal will result in a reduction of the pulse width of the pulse T, in such a way that the trailing edge of this pulse T is moved towards the instant $t_0$ (FIG. 5e), which in its turn results in a pulse W from the multivibrator 52 in accordance with FIG. 5f.

Thus it is achieved that the leading edge of the keying signal W is always controlled towards a position halfway between two consecutive zero passages of the burst signal, so that symmetrically about this position a maximum tolerance is permissible without giving rise to an erroneous time error measurement. The multivibrator 52 preferably takes the form of a monostable multivibrator which in the absence of a reset signal at the input 56 is automatically reset after for example 140 nanoseconds.

Figure 6:
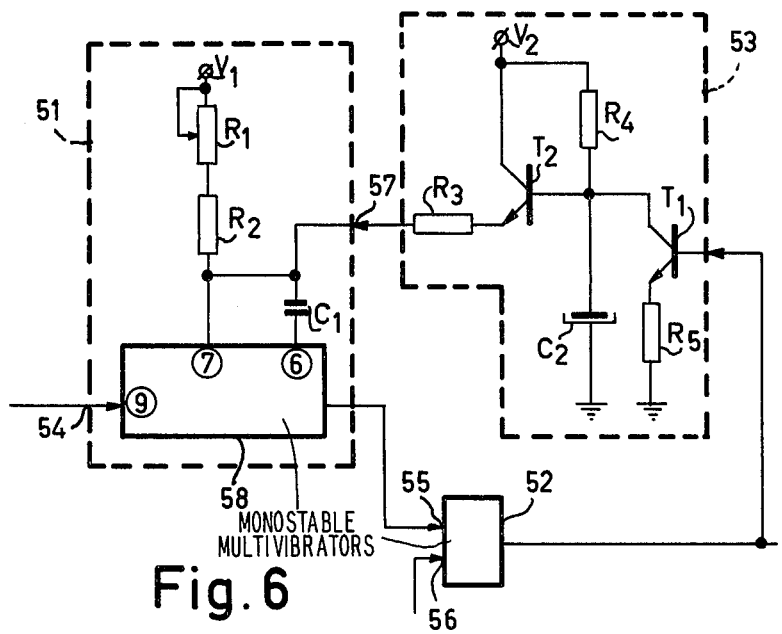
FIG. 6 shows a practical embodiment of the keying signal generator utilized in the apparatus in accordance with the invention.

A practical embodiment of the monostable multivibrator 51 in conjunction with the measuring circuit 53 is shown in FIG. 6. The measuring circuit 53 comprises a capacitance $C_2$(4.7μF) which is connected to a voltage source $V_2$ and which is charged via a resistor $R_4$(220 kohms). The charge of this capacitance $C_2$, i.e. the voltage across it, depends on the signal on the base of a transistor $T_1$. The base of the transistor $T_1$ receives the output pulse W of the multivibrator 52 and this transistor conducts for the duration of this pulse, so that the voltage across the capacitance $C_2$ is determined by the pulse duration of this output pulse W of the multivibrator 52. The voltage across the capacitance $C_2$ is applied to an emitter-follower $T_2$ and with the aid of a resistor $R_3$ (150 kohms) it is converted into a control current which is applied to the control terminal 57 of the monostable multivibrator 51.

This monostable multivibrator 51 comprises an integrated multivibrator circuit 58 of the type SN 74123 (Signetics), whose time constant, i.e. pulse duration, is determined by the capacitance $C_1$(3300 pF) and the resistors $R_1$(2.2 kohms) and $R_2$(6.2 kohms). As the control input 57 is connected to this capacitance $C_2$ the charge on this capacitance $C_2$ and thus the time constant depend on the correction current. By dimensioning the resistors and capacitances as specified it is achieved that the pulse duration of the output pulse of this monostable multivibrator circuit 58 as a function of the correction current can vary minimum approx 140 nanoseconds, i.e. maximum half the period of the NTSC colour burst signal. It is obvious that many modifications to this circuit arrangement are possible. For example, it is also possible to use a variable delay means instead of the monostable multivibrator.

Figure 7:
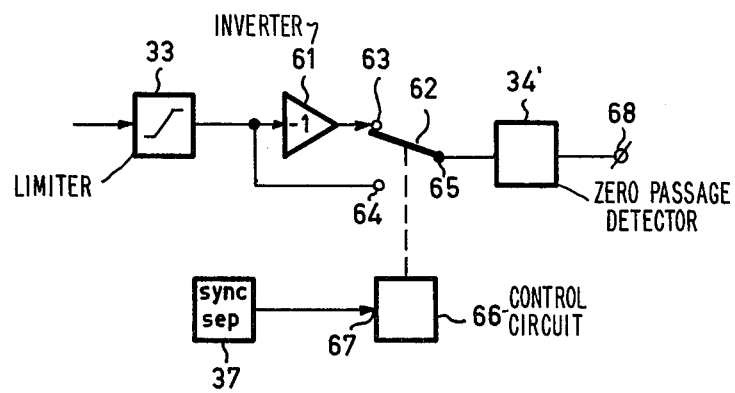
FIG. 7 is an extension of the measuring system.

FIG. 7 shows a variant of the circuit arrangement of FIG. 4, corresponding elements being denoted by the same reference numerals. The output signal of the limiter circuit 33 in this circuit arrangement is not applied directly to the zero passage detector 34, but is applied both directly to an input 64 and via an inverting amplifier 61 to an input 63 of a two-position switch 62 whose master contact 65 is connected to the zero passage detector 34'. This switch 62 is controlled by a control circuit 66 which receives the horizontal synchronizing pulse train supplied by the sync separator 37 at an input 67. This control circuit 66 then supplies a symmetrical control signal of half the line frequency to the switch 62 so that this switch is changed over from line to line. Thus, it is ensured that the color burst signals of consecutive lines, which are applied to the zero passage detector 34' always have the same phase with respect to each other. This means that this zero passage detector 34' no longer need be of the absolute type, as in the version in accordance with FIG. 4, but should merely respond to the zero passages which occur in the case of one specific sign of the slope of the color burst signal. This means that this zero passage detector 34' may then take the form of a simple monostable mulitivibrator.

As previously stated, the invention is by no means limited to optical read apparatus but is also applicable to read apparatus for a magnetic record carrier in the form of a tape. Furthermore, the circuit arrangement of the time error correction system is not limited to the system described. In principle, any suitable time error correction system, whether electromechanical or electronic, may be used, the ultimate choice being generally determined by the type of read system.

Furthermore, the invention is not limited to the coding system described by way of example, in which a complete standard NTSC color television signal is freqency modulated on a carrier wave. The invention may for example equally be used with coding systems in which, during recording, the chrominance signal is extracted and transposed to a lower frequency band, i.e. is recorded as a modulation of a separate chrominance wave, while the luminance signal is frequency modulated on a carrier wave of comparatively high freqency. In such coding systems the freqeuncy of the separate chrominance carrier is generally an integral multiple of half the line frequency. During reproduction the read-out chrominance signal is than re-transposed to the standard frequency band by mixing it with a suitable mixing frequency, so that again a standard NTSC or PAL color television signal is obtained. By ensuring that the mixing frequency has the same time errors as the read-out chrominance signal, the influence of these timing errors on the ultimately obtained standard color television signal is substantially reduced. By the indicated choice of the frequency of the separate chrominance carrier it is achieved that as pilot tone for producing this mixing frequency use can simply be made of the read-out horizontal synchronizing pulse train as is for example comprehensively described in U.S. Pat. No. 3,803,347. Instead of this horizontal synchronizing pulse train it is then obvious that use can also be made of a zero passage of the color burst signal with the aid of a device in accordance with the present invention. In that case it is also possible to use the color burst signal present in the color signal, or an additional burst signal on the backporch of the horizontal synchronizing pulses, which has been added to the luminance signal during recording.

Furthermore it is not necessary to separate the pilot tone from the complete decoded television signal (output of decoder 18). Dependent on the coding system this pilot tone could be separated somewhere within the decoding process.

It is to be noted that although the invention will primarily be used to advantage for reading out a color television signal, this invention may also be used for reading out a black-and-white television signal. For this purpose, it will only be necessary to add burst signals on the backporch of the horizontal synchronizing pulses during recording.

Figure 8:
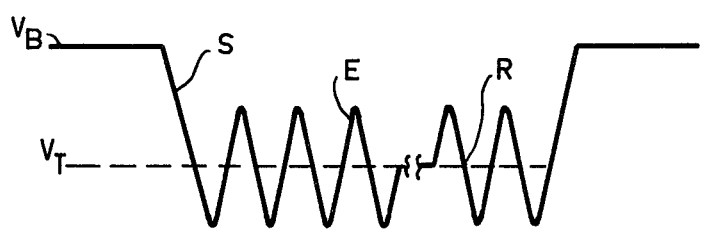
FIG. 8 represents an additional burst signal on the line synchronizing pulse.

Finally, the possibility will be described of adding an additional burst signal to the television signal during recording, which burst signal may be utilized for accurately measuring the time errors during reproduction. This possibility is represented in FIG. 8. This Figure again shows a horizontal synchronizing pulse S of a television signal with a horizontal blanking level $V_B$ and a peak level $V_T$. However, prior to recording, a burst signal E has been superimposed on this horizontal synchronizing pulse S, i.e. on the peak level $V_T$ thereof. This burst signal E has a frequency which is an integral multiple of half the line frequency and preferably an integral multiple of the whole line frequency.

During reproduction of the recorded television signal this additional burst signal is extracted, after which in a similar way as described hereinbefore with respect to the NTSC color burst signal the position of a specific zero passage of this additional burst signal can be detected during each line period and can serve for measuring time errors.

The use of this additional burst signal is of special importance when recording and reproducing a color television signal which complies with the PAL standard. In this case the color burst signal cannot simply be used in the described time error measuring system because the frequency of said PAL color burst signal is an odd multiple of ¼ $f_H$ and moreover exhibits a 25-Hz offset.

If furthermore an additional burst signal with a frequency equal to a multiple of the line frequency is used, a non-absolute zero passage detector may be used for detecting the zero passages, i.e. a detector which detects only the zero passages which correspond either the positive-going or the negative-going edges. Thus, the time interval within which the beginning of the keying signal should occur is doubled compared with the use of the NTSC color burst signal, because this now corresponds to a full period of the burst signal. Finally, the use of this additional burst signal superimposed on the horizontal synchronizing pulse has the advantage that the first time interval, i.e. the time between the leading edge of the horizontal synchronizing pulse and the keying signal is substantially shorter than when the color burst signal is used. This shorter time interval can be realized more accurately with the aid of multivibrator circuits, which adds to the reliability of the system.

The embodiments of the invention in which an exclusive property or privilege is claimed are defined as follows:

1. An apparatus for reading a record carrier on which a television signal is recorded, said signal comprises horizontal synchronizing pulses and burst signals which are coupled to these horizontal synchronizing pulses, said burst signals consisting of a number of periods of a carrier wave with a frequency which is an integral multiple of half the line frequency, said read apparatus comprising a time error correction device for correcting time errors in the read-out television signals, a time error detector means for detecting said time errors and for supplying a corresponding control signal to the time error correction device, said time error detector means comprising a keying signal generator means triggered by the horizontal synchronizing pulses for supplying a keying signal having a predetermined phase relationship with said horizontal synchronizing pulse, said phase relationship being such that the beginning of the keying signal each time lies within the time interval occupied by the burst signal, a zero passage detector means for detecting the first zero passage of the burst signal which appears after the beginning of said keying signal, a measuring circuit means for measuring the time interval between the beginning of this keying signal and the next zero passage of the burst signal which is detected and for supplying a corresponding correction signal, said keying signal generator means further comprising means for adjusting the phase of the keying signal relative to the horizontal synchronizing pulse depending on the correction signal.

2. An apparatus for reading a record carrier on which a television signal including horizontal synchronizing pulses and burst signals having a predetermined phase relationship with respect to the synchronizing pulses is recorded, said first signals comprising a plurality of periods of a carrier wave having a frequency equal to an integral multiple of one-half the frequency of the horizontal synchronization pulses, said read apparatus comprising a time error detector means for detecting phase errors in the reproduction of said television signal, said time error detector means including a keying signal generator means triggered by said horizontal synchronizing pulses for supplying a keying signal delayed by a control-signal-variable time interval, the beginning of each of said keying signals lying within the time interval occupied by the burst signal, a zero passage detector means for detecting the first zero passage of the burst signal appearing after the beginning of said keying signal, a measuring circuit means for measuring the time interval between the beginning of the keying signal and the next zero passage of the detected burst signal and for providing a control signal, said keying signal generator means comprising a first and a second multivibrator, said first multivibrator being a monostable mulitivibrator providing with a set input connected to receive said horizontal synchrizing pulses, a control input connected to receive said control signal, and an output for providing an output pulse having a pulse duration varying in accordance with said control signal, said second multivibrator being provided with a set input connected to the output of the first multivibrator and triggerable by the trailing edge of the output pulse of the first multivibrator and providing said keying signal at an output thereof, and a time error correction device responsive to said keying signal for correcting time errors in the read-out television signals.

3. An apparatus as claimed in claim 2, wherein the second multivibrator has a reset input, to which a pulse which is determined by the detected zero passage of the burst signal is applied for resetting this second multivibrator.

4. An apparatus as claimed in claim 3, wherein the second multivibrator is automatically reset after a fixed time interval after the beginning of the keying signal.

5. An apparatus as claimed in claim 4, wherein a burst signal with a frequency which is an odd multiple of half the line frequency is used, the second multivibrator being automatically reset after a time interval which substantially corresponds to half the period of said burst signal.

6. An apparatus as claimed in claim 5, wherein the output signal of the second multivibrator is applied to the measuring circuit means.

7. An apparatus as claimed in claim 4, wherein a burst signal with a frequency which is an integral multiple of the line frequency is used, the second multivibrator being automatically reset after a time interval which substantially corresponds to the period of said burst signal.

8. An apparatus as claimed in claim 7, wherein the output signal of the second multivibrator is applied to the measuring circuit means.

9. An apparatus as claimed in claim 3, wherein the output signal of the second multivibrator is applied to the measuring circuit means.

10. An apparatus as claimed in claim 4, wherein the ouput signal of the second multivibrator is applied to the measuring circuit means.